US007738478B2

(12) United States Patent
Hong et al.

(10) Patent No.: US 7,738,478 B2
(45) Date of Patent: Jun. 15, 2010

(54) APPARATUS AND METHOD FOR DETERMINING DOWNSTREAM TOPOLOGY IN HYBRID-FIBER COAXIAL NETWORK

(75) Inventors: Seung-Eun Hong, Daejon (KR); Ho-Jin Kwon, Daejon (KR); O-Hyung Kwon, Daejon (KR); Soo-In Lee, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 733 days.

(21) Appl. No.: 11/644,211

(22) Filed: Dec. 22, 2006

(65) Prior Publication Data
US 2008/0056292 A1     Mar. 6, 2008

(30) Foreign Application Priority Data
Aug. 31, 2006   (KR)   .................. 10-2006-0083751

(51) Int. Cl.
H04L 12/28 (2006.01)
G01R 31/08 (2006.01)
(52) U.S. Cl. ..................... 370/431; 370/231
(58) Field of Classification Search ........... 370/431, 370/231
See application file for complete search history.

(56) References Cited
U.S. PATENT DOCUMENTS

| | | | |
|---|---|---|---|
| 6,400,863 B1 | 6/2002 | Weinstock et al. | |
| 6,704,288 B1 | 3/2004 | Dziekan et al. | |
| 7,246,368 B1 * | 7/2007 | Millet et al. | 725/111 |
| 2004/0095963 A1 * | 5/2004 | Rakib | 370/503 |
| 2004/0244043 A1 * | 12/2004 | Lind et al. | 725/111 |
| 2008/0056130 A1 * | 3/2008 | Desai et al. | 370/231 |

OTHER PUBLICATIONS

Notice of Korean Patent Grant dated Jun. 26, 2007 for the corresponding application KR 10-2006-0083751.
Cable Television Laboratories, Inc., "MAC and Upper Layer Protocols Interface Specification", Aug. 4, 2006, *Data-Over-Cable Service Interface Specifications DOCSIS3.0*.

* cited by examiner

*Primary Examiner*—Derrick W Ferris
*Assistant Examiner*—Angel Brockman
(74) *Attorney, Agent, or Firm*—Ladas & Parry LLP (57) ABSTRACT

An apparatus for determining a downstream topology in a hybrid-fiber-coaxial network includes: a signal branching unit for branching a signal received from a cable modem termination system into a plurality of branched signals; a plurality of signal selecting units for selectively receiving a frequency band signal corresponding to a specific downstream channel among the plurality of branched signals; a downstream topology determining unit for analyzing a downstream ambiguity resolution frequency list contained in a channel information message of a downstream primary channel received from the cable modem termination system, collecting in parallel channel information messages with respect to a plurality of downstream channels, and determining a downstream topology at a high speed using the collected channel information messages; and a plurality of packet generating units for setting downstream channel frequency bands of the signal selecting units under control of the downstream topology determining unit, and sending the channel information messages of the collected downstream channels to the downstream topology determining unit.

5 Claims, 7 Drawing Sheets

APPARATUS AND METHOD FOR DETERMINING DOWNSTREAM TOPOLOGY IN HYBRID-FIBER COAXIAL NETWORK

FIELD OF THE INVENTION

The present invention relates to an apparatus and method for determining a downstream topology in a hybrid-fiber-coaxial (HFC) network; and, more particularly, to an apparatus and method for determining a downstream topology in an HFC network, which is capable of determining a network topology at a high speed in a cable modem of the HFC network that can receive a plurality of downstream channels at the same time.

DESCRIPTION OF RELATED ART

With the recent advance of information age, the use of the Internet increases exponentially and the demand of multimedia data increases, causing a bottleneck phenomenon in a transmission network. Integrated Services Digital Network (ISDN), Asymmetric Digital Subscriber Line (ADSL), cable TV network, satellite and Wireless Local Loop (WLL) are used to solve the bottleneck phenomenon and provide data service at higher speed. Compared with other networks, the cable TV network has a wide bi-directional bandwidth and a plenty of cables are installed up to subscriber terminals. Therefore, the cable TV network is considered as one of the most suitable networks.

However, because the cable TV network is designed for a broadcasting rather than a bi-directional multimedia service, an existing transmission network must be improved in order to provide a high-speed data service using the cable TV network. To this end, a hybrid-fiber-coaxial (HFC) network has been introduced.

The HFC network connects a broadcasting system to a fiber node through an optical cable, and connects the remaining fiber nodes to subscribers through a coaxial cable.

Generally, in the HFC network, a single cable modem termination system forms a star topology through the distributed optical nodes and the optical cables. A single optical node and a plurality of cable modems form a tree and branch topology.

In the HFC network, the cable modems connected to the same optical node can reach the same upstream/downstream channel group provided by the cable modem termination system. Random upstream/downstream channels belonging to the channel group may be connected to another optical node. Due to these topology features, it may often occur that the cable modem termination system cannot determine which channel group the cable modem belongs to.

To solve these problems, the topology is determined by sequentially searching the respective downstream channels in the cable modem and examining the channel information messages sent to the corresponding channels.

Figure 1:
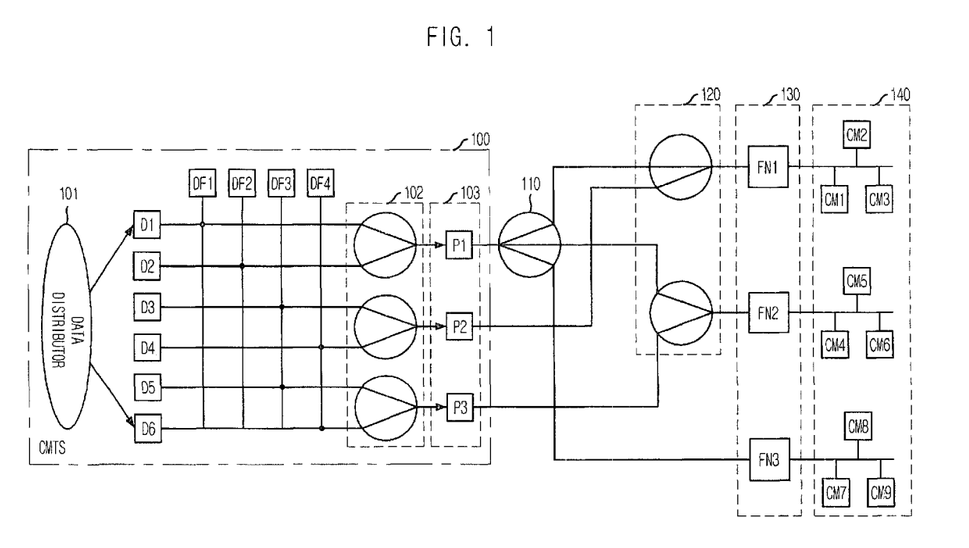
FIG. 1 illustrates a conventional hybrid-fiber-coaxial (HFC) network.

FIG. 1 illustrates a conventional HFC network.

Referring to FIG. 1, the conventional HFC network includes a cable modem termination system 100, a frequency divider 110, a frequency combiner 120, a plurality of optical nodes 130, and a plurality of cable modems 140.

The cable modem termination system provides six downstream channels D1, D2, D3, D4, D5 and D6 and four downstream frequency resources DF1, DF2, DF3 and DF4.

The cable modem termination system 100 configures two downstream channels using two different downstream frequencies and provides a single downstream port 103 through the frequency combiner 102. For example, the downstream channels D1 and D2 generated using the frequencies DF1 and DF2 are provided through a port P1. The channels and the frequency resources provided through the downstream port 103 are provided through the frequency divider 110 and the frequency combiner 120 to the optical nodes FN1, FN2 and FN3. The plurality of cable modems 140 connected to the optical node 130 use the channels and the frequency resources.

A network operator can form a network topology such that a random downstream group can reach a specific cable modem. That is, the network operator can uniformly distribute traffic load to the respective channels when a data distributor 101 transmits data to the downstream channel, or can form a network topology of a downstream channel in order to provide a channel bonding service transmitting data over a plurality of downstream channels that can be received by a specific cable modem.

In order to provide a load distribution function and a channel bonding service, the cable modem termination system 100 must recognize which downstream service-group (DS-SG) the specific cable modem can receive.

For example, the cable modems CM1, CM2 and CM3 connected to the optical node FN1 can reach the downstream channels D1, D2, D3 and D4. On the other hand, the cable modems CM4, CM5 and CM6 connected to the optical node FN2 can reach the downstream channels D1, D2, D5 and D6. Also, the cable modems CM7, CM8 and CM9 can reach the downstream channels D1 and D2.

The downstream topology information determined by the cable modem termination system 100 cannot be recognized by the cable modem. The cable modem termination system 100 cannot individually recognize the DS-SG to which the cable modem belongs. To solve these problems, the cable modem termination system 100 broadcasts the channel information message over the downstream channels, as illustrated in FIG. 2. The channel information message transmitted over a specific downstream channel D1 determined as a downstream primary channel contains detail information that can determine the downstream topology as well as a basic channel information.

Figure 2A:
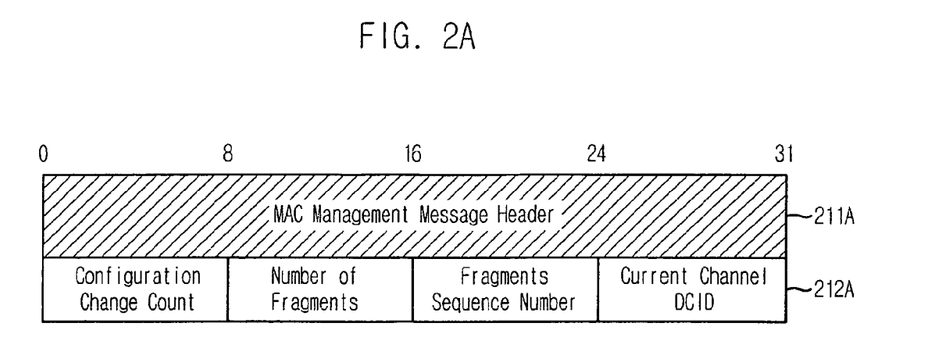
FIGS. 2A and 2B illustrates a channel information message sent over a downstream channel by a conventional cable modem termination system.
Figure 2B:
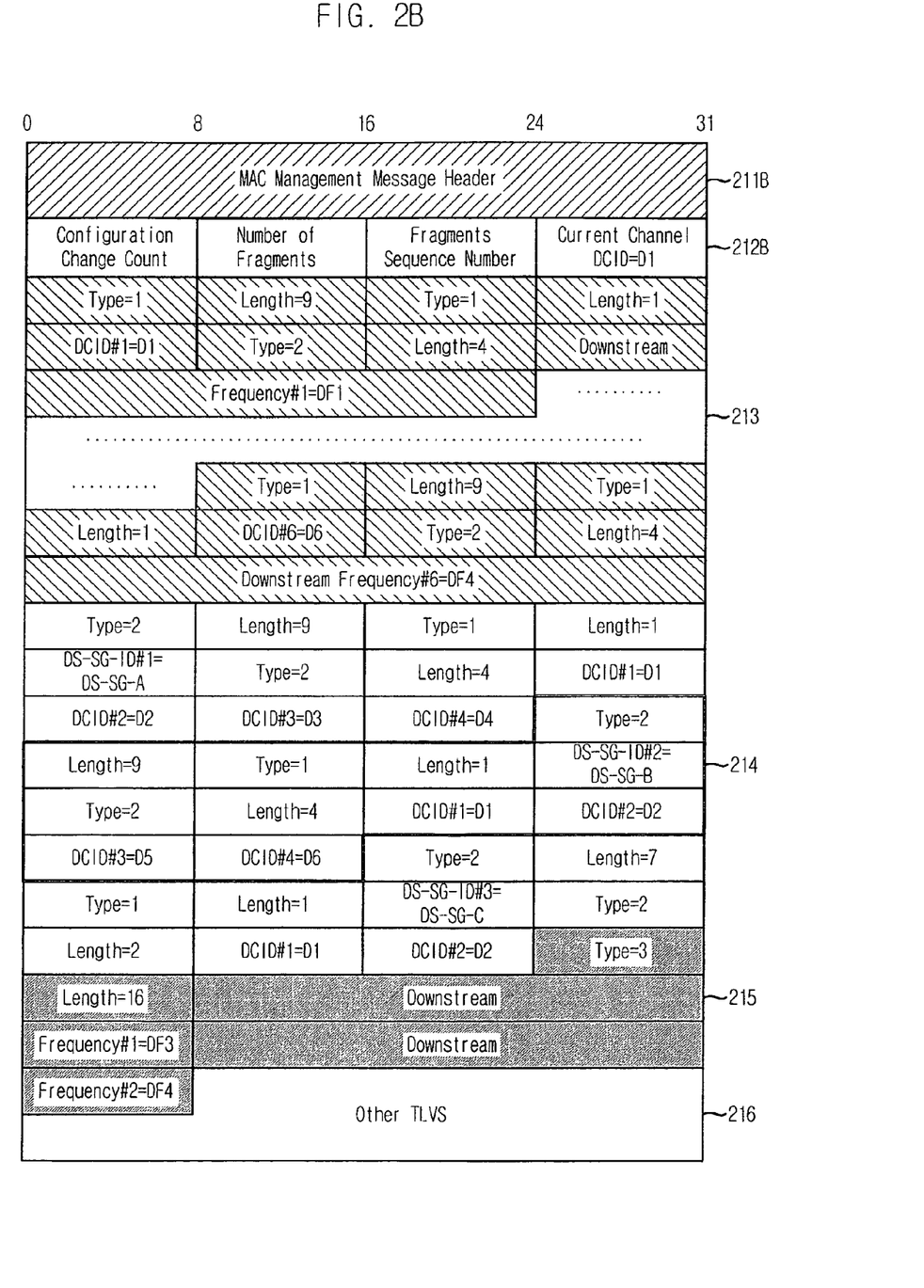

FIGS. 2A and 2B illustrate the channel information message transmitted over the downstream channel in the conventional cable modem termination system.

The channel information message of FIG. 2A is a channel information message that the cable modem termination system 100 transmits over the general downstream channels D2, D3 and D4 other than the downstream primary channel. The channel information message includes a MAC management message header 211a and a fixed field 212a storing the information about the downstream channel.

The channel information message of FIG. 2B is a channel information message that the cable modem termination system 100 transmits over the downstream channel D1 determined as the downstream primary channel. The channel information message includes a MAC management message header 211b, a fixed field 212b, and fields 213, 214, 215 and 216 storing the downstream topology determination information.

In the fixed field 212, channel information D1 is recorded in a current downstream channel ID (DCID) field. The downstream topology determination information includes a downstream active channel information field 213, a DS-SG information field 214, a downstream ambiguity resolution frequency list information field 215, and other TLVS field 216. The downstream topology determination information is coded in a type length value type.

The downstream active channel information field 213 records information about the downstream channels provided by the cable modem termination system 100 and is repetitively coded as many as the number of the downstream channels. A DCID and a frequency value of a channel indicated by the DCID are coded in the single active channel information.

The DS-SG information field 214 is a DS-SG list information provided by the cable modem termination system 100 and is repetitively coded as many as the service groups. The DS-SG ID and the downstream channels are coded in the single DS-SG information.

The downstream ambiguity resolution frequency list information field 215 indicates the channel frequency list that can resolve the topology ambiguity. For example, in the topology of FIG. 1, the downstream channels D3 and D5 are provided over the downstream frequency DF3, and the downstream channels D4 and D6 are provided over the downstream frequency DF4. Therefore, the channel frequencies DF3 and DF4 can resolve the ambiguity.

The other TLVS field 216 includes additional channel information.

The procedures of resolving the topology ambiguity in the cable modem 140 of the conventional HFC network will be described below with reference to FIG. 3.

Figure 3:
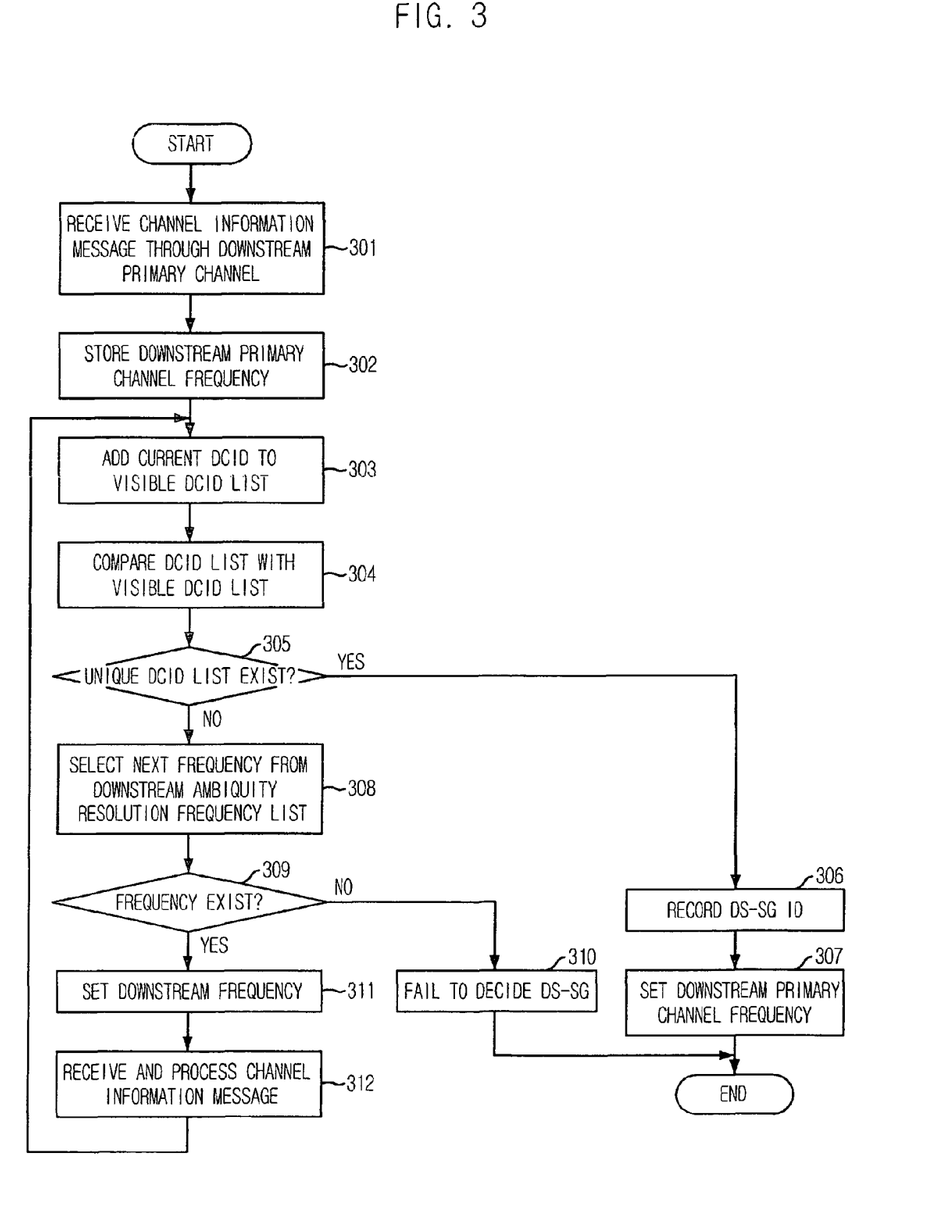
FIG. 3 is a flowchart illustrating a procedure of solving a topology ambiguity at a cable modem termination system of a conventional hybrid-fiber-coaxial network.

Referring to FIG. 3, in step S301, the cable modem 140 selects the downstream primary channel, receives the channel information message sent over the selected downstream primary channel, and analyzes the topology resolution information. In step S302, after completing the topology determination process, cable modem 140 stores the frequency of the downstream primary channel in order to feed back to the downstream primary channel.

In step S303, the cable modem 140 creates a visible DCID list having the downstream primary channel ID as a first entry. In step S304, the DCID list of the DS-SG described in the channel information message received over the downstream primary channel is compared with the visible DCID list. In step S305, it is checked if the DCID list of the DS-SG containing the visible DCID list is unique.

In step S306, when the unique DS-SG exists, the DS-SG ID of the unique DS-SG list is recorded and determined as the DS-SG. In step S307, the topology determination is completed by setting the frequency of the downstream primary frequency.

In step S308, when the unique DS-SG list does not exist, the frequency firstly recorded in the downstream ambiguity resolution frequency list of the channel information message received through the downstream primary channel is selected. In step S309, it is determined if there exists the frequency that can be selected from the downstream ambiguity resolution frequency list. In step S311, the corresponding frequency is selected and set as the downstream channel frequency. In step S312, the channel information message is received in the set channel and processed. Then, the process returns to step S303 to process the topology determination procedure for a next downstream channel.

In step S310, when there is no frequency that can be selected, it is considered as failure of the DS-SG determination and the topology determination is completed.

As described above, although the conventional cable modem 140 has the capability of receiving the plurality of downstream channels at the same time, the channel information message is received by searching one downstream channel at a time step by step. Therefore, it takes a lot of time to determine the topology.

SUMMARY OF THE INVENTION

It is, therefore, an object of the present invention to provide an apparatus and method for determining a downstream topology in a cable modem of an HFC network, which can determine the downstream topology at a high speed by collecting a channel information message in parallel from a plurality of downstream channels.

In accordance with an aspect of the present invention, there is provided an apparatus for determining a downstream topology in a hybrid-fiber-coaxial network, including: a signal branching unit for branching a signal received from a cable modem termination system into a plurality of branched signals; a plurality of signal selecting units for selectively receiving a frequency band signal corresponding to a specific downstream channel among the plurality of branched signals; a downstream topology determining unit for analyzing a downstream ambiguity resolution frequency list contained in a channel information message of a downstream primary channel received from the cable modem termination system, collecting in parallel channel information messages with respect to a plurality of downstream channels, and determining a downstream topology at a high speed using the collected channel information messages; and a plurality of packet generating units for setting downstream channel frequency bands of the signal selecting units under control of the downstream topology determining unit, and sending the channel information messages of the collected downstream channels to the downstream topology determining unit.

In accordance with another aspect of the present invention, there is provided a method for determining a downstream topology in a hybrid-fiber-coaxial network, including the steps of: a) receiving and analyzing a channel information message transmitted over a downstream primary channel; b) creating a visible downstream channel ID list having a downstream channel ID of a current downstream channel as a first entry; c) comparing the visible downstream channel ID list with a downstream channel ID list of a downstream service group contained in the channel information message received through the downstream primary channel, and determining if a downstream channel ID list of a downstream service group containing the visible downstream channel ID list exists uniquely; d) collecting the channel information messages from a plurality of downstream channels in parallel according to an order recorded in the downstream ambiguity resolution frequency list when the downstream channel ID list does not exist uniquely; and e) recording the downstream service group ID of the unique downstream service group list when the downstream channel ID list exits uniquely and determining as the downstream service group, and completing the downstream topology determination by setting a frequency of the determined downstream primary channel.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter.

Figure 4:
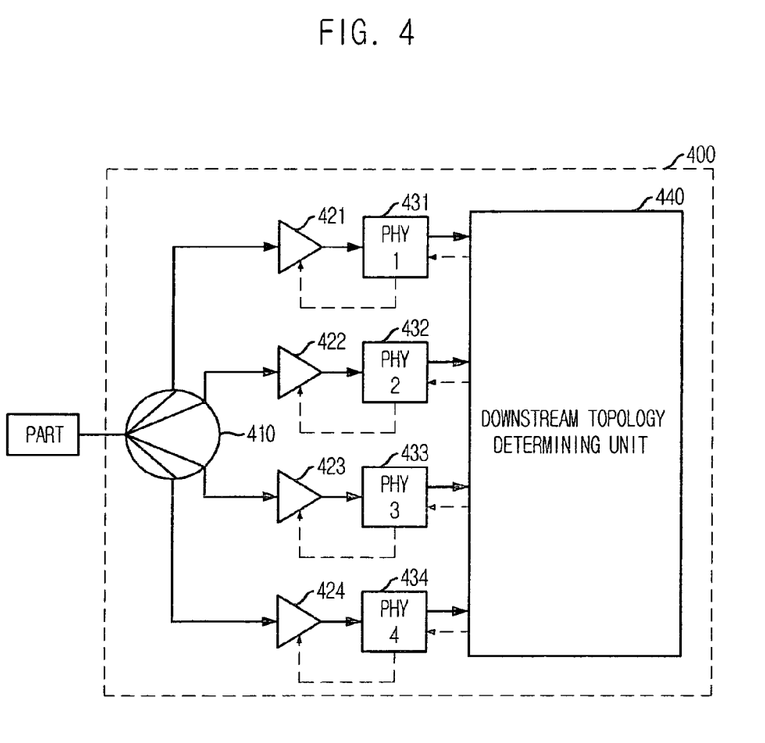
FIG. 4 illustrates an apparatus for determining a downstream topology in a hybrid-fiber-coaxial network according to an embodiment of the present invention.

FIG. 4 illustrates an apparatus 400 for determining a downstream topology in an HFC network in accordance with an embodiment of the present invention. The apparatus 400 is included in a cable modem. The apparatus 400 resolves a network topology ambiguity, i.e., a downstream topology ambiguity, and determines the downstream topology at a high speed by collecting in parallel channel information messages sent from a cable modem termination system over downstream channels.

Referring to FIG. 4, the apparatus 400 includes a signal branching unit 410, a plurality of signal selecting units 421 to 424, a plurality of packet generating units 431 to 434, and a downstream topology determining unit 440.

The signal branching unit 410 branches a channel information message received from the cable modem termination system through a port of the cable modem to the plurality of signal selecting units 421 to 424.

The signal selecting units 421 to 424 are mapped with the packet generating units 431 to 434 in 1:1 correspondence. A signal corresponding to a specific frequency band, i.e., a downstream channel, is set such that it is selectively inputted under control of the corresponding packet generating units 431 to 434. Consequently, the signal selecting units 421 to 424 selectively receive the channel information message corresponding to the frequency band of the preset specific downstream channel among the signals received through the signal branching unit 410 and send the received channel information message to the corresponding packet generating units 431 to 434.

The packet generating units 431 to 434 are connected to the signal selecting units 421 to 424 in 1:1 correspondence and collect the channel information message of the specific downstream channel under control of the downstream topology determining unit 440.

To this end, the packet generating units 431 to 434 receive the DCID and frequency information from the downstream topology determining unit 440 and store the DCID. The DCID is information about the downstream channel to collect the channel information message. Also, the packet generating units 431 to 434 are set such that the signal selecting units 421 to 424 connected thereto selectively receive the corresponding frequency band signals, i.e., the corresponding downstream channels. Then, the packet generating units 431 to 434 insert the previously stored DCID into the channel information message of the corresponding downstream channel received through the signal selecting units 421 to 424 and transmit to the downstream topology determining unit 440.

The downstream topology determining unit 440 analyzes the downstream ambiguity resolution frequency list contained in the channel information message of the downstream primary channel received from the cable modem termination system through the specific packet generating unit 431, and transmits the DCIDs and corresponding frequency information to the packet generating units 431 to 434 in order to collect the information about the downstream channels in parallel.

In addition, the downstream topology determining unit 440 recognizes the DCIDs inserted into the channel information messages collected from the packet generating units 431 to 434 and determines the downstream topology at a high speed using the information contained in the channel information messages. The procedure of resolving the topology ambiguity and determining the downstream topology using the channel information messages collected through the packet generating units 431 to 434 by the downstream topology determining unit 440 will be described later with reference to FIG. 7.

An operation of the apparatus 400 for determining the downstream topology will be described in detail.

Figure 5:
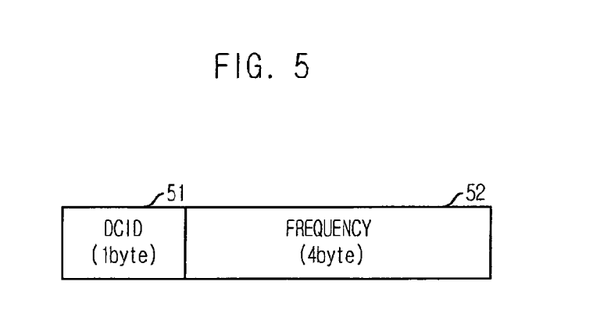
FIG. 5 illustrates a MAC-PHY interface packet according to an embodiment of the present invention.

The downstream topology determining unit 440 receives the channel information message of the downstream primary channel from the cable modem termination system through the specific packet generating unit 431. Then, the downstream topology determining unit 440 analyzes the downstream ambiguity resolution frequency list contained in the received channel information message, generates a plurality of MAC-PHY interface packet containing the DCIDs of the downstream channels and the corresponding frequency information, and transmits the MAC-PHY interface packet to the packet generating units 431 to 434. As illustrated in FIG. 5, the MAC-PHY interface packet generated by the downstream topology determining unit 440 includes a 1-byte DCID field 51 and a 4-byte frequency information field 52.

The packet generating units 431 to 434 extract the DCID information from the MAC-PHY interface packet and stores the extracted DCID information, and set the frequency bands of the signal selecting units 421 to 424 connected thereto according to the frequency information extracted from the MAC-PHY interface packet. Consequently, the signal selecting units 421 to 424 with different frequency bands selectively transmit to the corresponding packet generating units 431 to 434 only analog signals of the corresponding frequency bands among analog signals branched by the signal branching unit 410.

Figure 6:
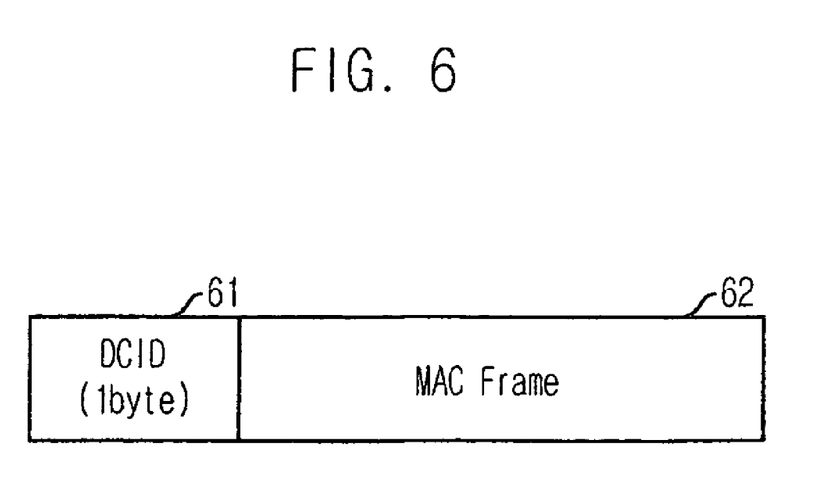
FIG. 6 illustrates a PHY-MAC interface packet according to an embodiment of the present invention.

The packet generating units 431 to 434 extract MAC frames from the analog signals received from the signal selecting units 421 to 424 mapped thereto and generate PHY-MAC interface packets containing the extracted MAC frame, i.e., the channel information message, and previously stored DCID information. As illustrated in FIG. 6, the PHY-MAC interface packet includes a 1-byte DCID information 61 and a MAC frame field 62 containing the channel information message.

The downstream topology determining unit 440 recognizes the DCID from the PHY-MAC interface packet collected by the packet generating units 431 to 434.

The process of determining the downstream topology in the HFC network in accordance with an embodiment of the present invention will be described below with reference to FIG. 7.

Figure 7:
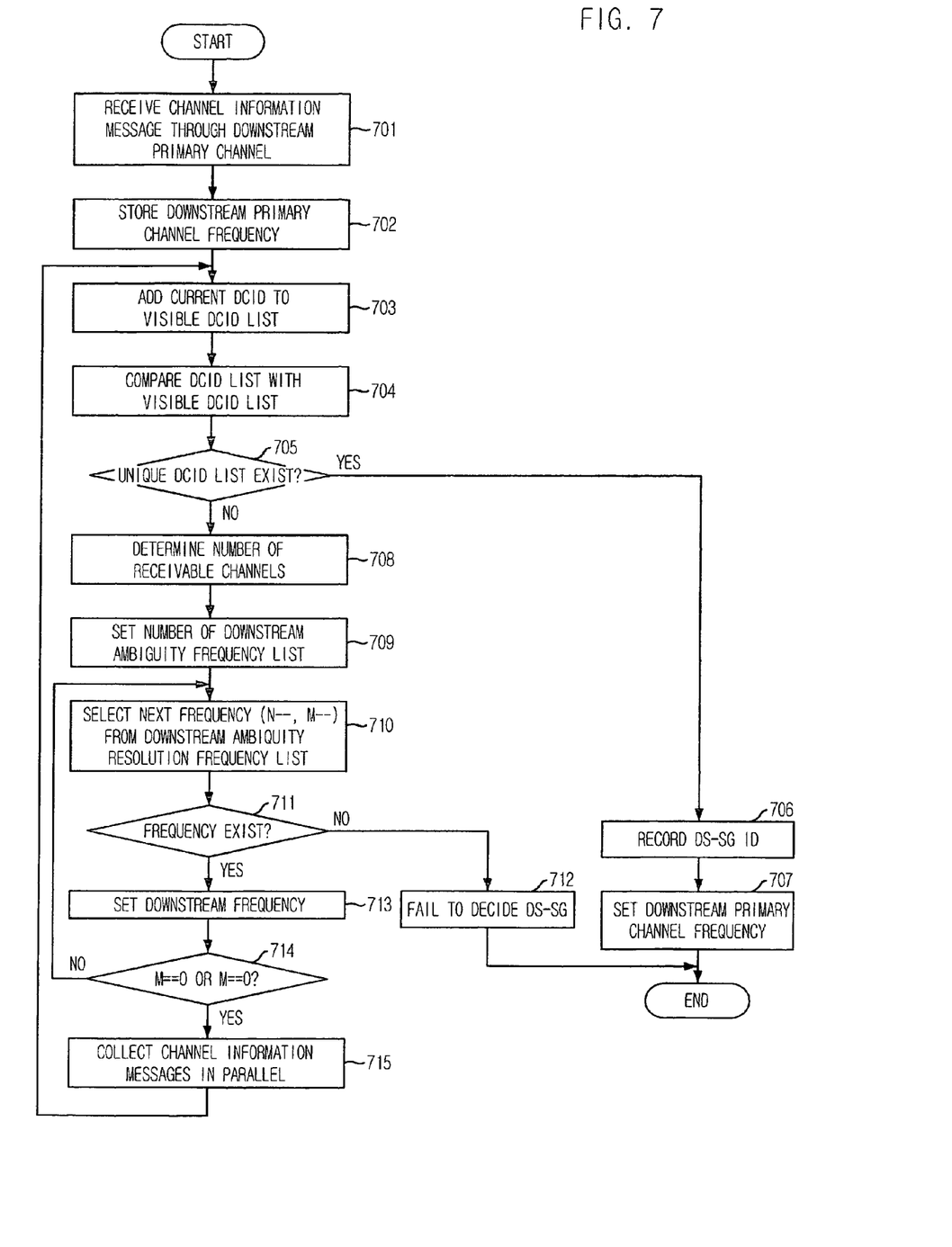
FIG. 7 is a flowchart illustrating a method for determining a downstream topology in a hybrid-fiber-coaxial network according to an embodiment of the present invention.

FIG. 7 is a flowchart illustrating the process of determining the downstream topology in the HFC network in accordance with an embodiment of the present invention.

Referring to FIG. 7, in step S701, the apparatus 400 for determining the downstream topology, which is installed in the cable modem, receives and analyzes the channel information message sent over the downstream primary channel. In step S702, after completing the downstream topology determination, the apparatus 400 stores the frequency of the downstream primary channel, which is necessary to feed back to the downstream primary channel.

In step S703, the apparatus 400 generates a visible DCID list having a current DCID as a first entry. In step S704, the apparatus 400 compares the visible DCID list with the DCID list of the DS-SG contained in the channel information message received through the downstream primary channel in step S701.

In step S705, the apparatus 400 determines if the DCID list of the DS-SG containing the visible DCID list exists uniquely. In step 708, when the unique list does not exist, the apparatus 400 determines the number N of current receivable channels (where N is a natural number) and the number M of downstream ambiguity resolution frequency lists. At this point, because the channels receiving the channel information message are usable, the value of N must be greater than or equal to 1. In addition, because one or more downstream ambiguity resolution frequency lists exist, the value of M is greater than or equal to 1.

In step S710, when the values of N and M are determined, the values of M and N decrease by one while selecting the frequency according to the order recorded in the downstream ambiguity resolution frequency list of the channel information message received through the downstream primary channel. In step 711, the apparatus determines if the frequency that can be selected from the downstream ambiguity resolution frequency list exists. In step 713, the existing frequency is set as the downstream frequency.

In step 714, the apparatus determines if M or N is 0. In step 715, when M or N is zero, the apparatus 400 collects in parallel the channel information message from the plurality of downstream channels. Then, the process returns to step 703. When M or N is not zero, the process returns to step 719.

In step 712, when there is no frequency that can be selected from the downstream ambiguity resolution frequency list in step 712, it is considered as a failure of the DS-SG determination and the downstream topology determination is finished.

In step 706, when the DCID list of the DS-SG containing the visible DCID list exists uniquely, the DS-SG ID of the unique DS-SG list is recorded and determined as the DS-SG. In step 707, the downstream topology determination is completed by setting the frequency of the determined downstream primary channel.

The apparatus in accordance with the present invention can determine the downstream topology at a high speed by collecting the channel information messages from the plurality of downstream channels in the cable modem of the HFC network.

The methods in accordance with the embodiments of the present invention can be realized as programs and stored in a computer-readable recording medium that can execute the programs. Examples of the computer-readable recording medium include CD-ROM, RAM, ROM, floppy disks, hard disks, magneto-optical disks and the like.

The present application contains subject matter related to Korean patent application No. 2006-0083751, filed in the Korean Intellectual Property Office on Aug. 31, 2006, the entire contents of which is incorporated herein by reference.

While the present invention has been described with respect to certain preferred embodiments, it will be apparent to those skilled in the art that various changes and modifications may be made without departing from the scope of the invention as defined in the following claims.

What is claimed is:

1. An apparatus for determining a downstream topology in a hybrid-fiber-coaxial network, comprising:
   a signal branching unit for branching a signal received from a cable modem termination system into a plurality of branched signals;
   a plurality of signal selecting units for selectively receiving a frequency band signal corresponding to a specific downstream channel among the plurality of branched signals;
   a downstream topology determining unit for analyzing a downstream ambiguity resolution frequency list contained in a channel information message of a downstream primary channel received from the cable modem termination system, collecting in parallel channel information messages with respect to a plurality of downstream channels, and determining a downstream topology at a high speed using the collected channel information messages; and
   a plurality of packet generating units for setting downstream channel frequency bands of the signal selecting units under control of the downstream topology determining unit, and sending the channel information messages of the collected downstream channels to the downstream topology determining unit;
   wherein the downstream topology determining unit analyzes the channel information message received through a downstream primary channel to create a visible downstream channel ID list having a downstream channel ID of a current downstream channel as a first entry, determines if a downstream channel ID list of a downstream service group containing the created visible downstream channel ID list exists uniquely, records a downstream service group ID of the unique downstream service group list to determine the downstream service group of the apparatus when the downstream channel ID list exists uniquely; collects the channel information messages from a plurality of downstream channels according to an order recorded in the downstream ambiguity resolution frequency list when the downstream channel ID list does not exist uniquely; and
   wherein the process of determining the downstream topology determines number (N) of current receivable channels and number (M) of downstream ambiguity resolution frequency lists, sets a frequency selectable from the downstream ambiguity resolution frequency list as a downstream frequency by decreasing the values of M and N by one while sequentially selecting frequencies according to the order recorded in the downstream ambiguity resolution frequency list, collects the channel information messages from the downstream channels in parallel when the value M or N is zero, and repeats the process of determining the downstream topology.

2. The apparatus as recited in claim 1, wherein the signal selecting unit and the packet generating units are mapped in 1:1 correspondence according to the downstream channels intended to collect the channel information messages.

3. The apparatus as recited in claim 2, wherein the downstream topology determining unit transmits downstream channel ID and corresponding frequency information to the packet generating unit in order to collect information about a plurality of downstream channels in parallel, and determines the downstream topology using information contained in the collected channel information messages.

4. The apparatus as recited in claim 3, wherein each of the packet generating units stores the downstream channel ID received from the downstream topology determining unit, sets an input frequency band of the signal selecting unit mapped thereto according to the frequency information transmitted from the downstream topology determining unit, inserts the previously stored downstream channel ID into a channel information message of a specific downstream channel received from the mapped signal selecting unit, and transmits to the downstream topology determining unit.

5. A method for determining a downstream topology in a hybrid-fiber-coaxial network, comprising the steps of:
   a) receiving and analyzing a channel information message transmitted over a downstream primary channel;
   b) creating by a device, a visible downstream channel ID list having a downstream channel ID of a current downstream channel as a first entry;
   c) comparing the visible downstream channel ID list with a downstream channel ID list of a downstream service group contained in the channel information message received through the downstream primary channel, and determining if a downstream channel ID list of a downstream service group containing the visible downstream channel ID list exists uniquely;
   d) collecting by a device, the channel information messages from a plurality of downstream channels in parallel according to an order recorded in the downstream ambiguity resolution frequency list when the downstream channel ID list does not exist uniquely; and
   e) recording the downstream service group ID of the unique downstream service group list when the downstream channel ID list exits uniquely and determining as the downstream service group, and completing the downstream topology determination by setting a frequency of the determined downstream primary channel, wherein the step d) comprising the steps of:
   d1) determining number (N) of current receivable channels and number (M) of downstream ambiguity resolution frequency lists;
   d2) decreasing the values of M and N by one while sequentially selecting frequencies according to the order recorded in the downstream ambiguity resolution frequency list, and determining if there exists a frequency selectable from the downstream ambiguity resolution frequency list;
   d3) setting the corresponding frequency as the downstream frequency when the frequency selectable from the downstream ambiguity resolution frequency list exists;
   d4) determining that the downstream service group determination fails when the frequency selectable from the downstream ambiguity resolution frequency list does not exist;
   d5) collecting the channel information messages from a plurality of the downstream channels in parallel when the value M or N is zero; and
   d6) repeating the process of determining the downstream topology.

* * * * *